Dec. 30, 1952      H. J. FEIBELMAN      2,623,256

CONNECTOR FOR BRACELETS AND THE LIKE

Filed May 19, 1950

INVENTOR.

Hans J. Feibelman

BY Nathaniel Frucht

ATTORNEY

Patented Dec. 30, 1952

2,623,256

UNITED STATES PATENT OFFICE 2,623,256

CONNECTOR FOR BRACELETS AND THE LIKE

Hans J. Feibelman, Providence, R. I.

Application May 19, 1950, Serial No. 163,065

1 Claim. (Cl. 24—208)

The present invention relates to the jewelry art, and has particular reference to connectors and fasteners for bracelets and the like.

The principal object of the invention is to provide a novel connection for two separable jewelry parts such as the ends of a bracelet or the like.

Another object of the invention is to provide a novel connection which utilizes separable magnetic parts.

A further object of the invention is to provide a novel magnetic type connector which has a mechanical strain resistant interlock.

With the above and other objects and advantageous features in view, the invention consists of a novel arrangement of parts more fully disclosed in the detailed description following, in conjunction with the accompanying drawings, and more specifically defined in the claim appended thereto.

Figure 1:
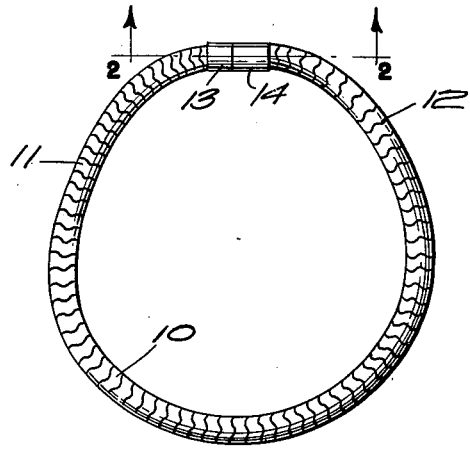
Fig. 1 is a plan view of a bracelet equipped with the novel connector.

It has been found desirable to provide a separable connection of the magnetic type for jewelry items, such as bracelets, necklaces, two part brooches, and the like. To this end, I provide one connection with a magnet, and the other connection with a steel plate, whereby the jewelry item has its separable parts magnetically secured together. I have further found that the magnetic pull is linearly strung, and that the effectiveness of the connection is increased if the parts are protected against lateral strain. I accomplish this by forming one connecting element with a recess to receive the other connecting element, thus providing a mechanical lock against lateral pressures.

Referring to the drawings, the invention is shown as embodied in a bracelet 10, which has its two ends 11, 12 respectively provided with connector elements 13, 14. The element 13 is in the form of a circular casing 15 of brass or other ornamental material which is non-magnetic, in which a steel plate 16 is set, with its forward end extended to provide a flange 17 enclosing a recess 18; the bracelet end 11 is locked within the shell 15 by soldering, swaging, or other suitable means.

Figure 2:
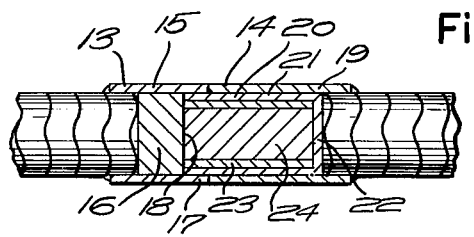
Fig. 2 is an enlarged sectional detail on the line 2—2 of Fig. 1.
Figures 3, 4:
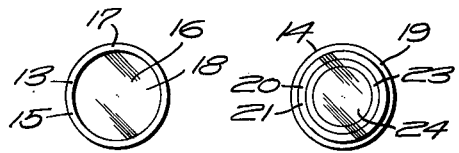
Fig. 3 is an end view of one connector element.
Fig. 4 is an end view of the other connector element.
Figure 5:
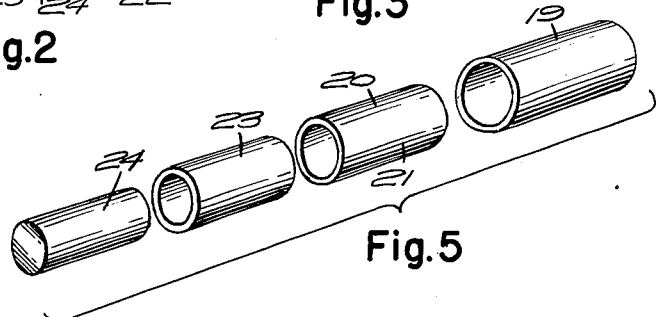
Fig. 5 is a perspective exploded view of the parts of Fig. 4.

The element 14 is in the form of a circular casing 19 of brass or other ornamental material which is non-magnetic, in which a steel cup 20 is seated, having a shell 21 and a base 22, a non-magnetic shell 23 of brass or the like being seated in the shell 21 and a magnet 24 being seated in the shell 23 in contacting relation to the steel base 22. As illustrated in Fig. 2, the magnetic assembly of the shells 21, 23 and the magnet 24 projects forwardly in the casing 19 to slide fit into the recess 18 within the flange 17. The steel plate 16 and the magnetic assembly 21, 22 and 24 thus form the two parts of a magnetic couple.

When the parts are placed together with the magnetic assembly in the casing 19 inserted in the recess 18, the magnet 24 and the outer edge of the steel cup 20 contacts the steel plate 16 and form a magnetic field through the plate 16, the shell 20 and the base 22. The seating of the magnetic assembly in the flange 17 mechanically locks the parts together against lateral strain.

Figure 6:
Figs. 6 and 7 are views corresponding to Figs. 3 and 4, but showing a modified shape.
Figure 7:
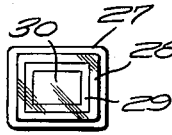
Figure 2A:
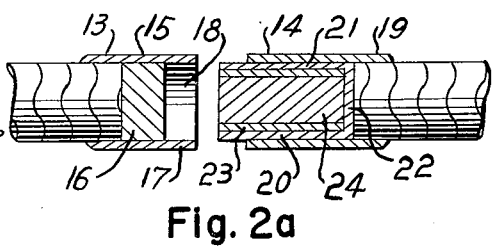
Fig. 2a is a view similar to Fig. 2, showing the parts separated.

If desired, the parts may be of non-circular shape, as shown in Figs. 6 and 7, wherein the rectangular casing 25 has a rectangular steel plate 26 inset therein, and the rectangular casing 27 has a rectangular magnetic assembly inset therein comprising a steel cup 28, a brass or other non-magnetic shell 29, and a magnet 30. Any other suitable shape may be used as desired.

The invention thus contemplates the mounting of a magnet in one connector and of a steel plate in the other connector, the magnet having a surrounding steel cup with its sides separated from the magnet by insulation, whereby a magnetic circuit is set up through the steel plate, the two connectors being mechanically locked against lateral strain. When the invention is applied to watch bracelets, the non-magnetic outer casing seals the magnetic circuit and prevents magnetic reaction on the watch parts.

Although I have described a specific embodiment of the invention, it is obvious that changes in the size, shape and material of the parts may be made to suit different jewelry design requirements, without departing from the spirit and the scope of the invention as defined in the appended claim.

I claim:

A separable connector for an article of jewelry, comprising two elements adapted to be assembled and separated in longitudinal relation, one element having a non-magnetic casing, a steel plate seated therein, and a flange forming a terminal recess, and the other element having a non-magnetic casing, a steel cup mounted therein and having its outer end projecting therefrom, a magnet seated in said steel cup and an insulating shell insulating the lateral walls of the magnet from said steel cup, the steel cup having a sliding fit in the terminal recess for contacting the steel plate when the elements are in assembled relation.

HANS J. FEIBELMAN.

REFERENCES CITED

The following references are of record in the file of this patent:

UNITED STATES PATENTS

| Number | Name | Date |
|---|---|---|
| 1,198,227 | Hinchey | Sept. 12, 1916 |
| 2,288,688 | Dubilier | July 7, 1942 |
| 2,483,031 | Avedon | Sept. 27, 1949 |